United States Patent
Himmelmann

(10) Patent No.: US 7,708,663 B2
(45) Date of Patent: May 4, 2010

(54) CONTINUOUSLY VARIABLE CONSTANT MESH EPICYCLIC TRANSMISSION

(75) Inventor: Richard A. Himmelmann, Beloit, WI (US)

(73) Assignee: Hamilton Sundstrand Corporation, Rockford, IL (US)

( * ) Notice: Subject to any disclaimer, the term of this patent is extended or adjusted under 35 U.S.C. 154(b) by 556 days.

(21) Appl. No.: 11/527,984

(22) Filed: Sep. 27, 2006

(65) Prior Publication Data

US 2008/0076614 A1   Mar. 27, 2008

(51) Int. Cl.
*F16H 3/72* (2006.01)
(52) U.S. Cl. .................. 475/1; 475/5; 475/151
(58) Field of Classification Search ............ 475/1, 475/5, 7, 149, 151, 269, 329, 24, 28, 32, 475/73, 75; F16H 3/72
See application file for complete search history.

(56) References Cited

U.S. PATENT DOCUMENTS

| | | | |
|---|---|---|---|
| 1,270,028 A * | 6/1918 | Henderson | 318/8 |
| 3,823,620 A | 7/1974 | Bricout | |
| 5,571,058 A * | 11/1996 | Schmidt | 475/5 |
| 6,491,599 B1 * | 12/2002 | Schmidt | 475/5 |
| 6,718,955 B1 * | 4/2004 | Knight | 123/559.1 |
| 2004/0209722 A1* | 10/2004 | Ai | 475/5 |
| 2005/0209760 A1* | 9/2005 | Tabata et al. | 701/53 |
| 2007/0197335 A1* | 8/2007 | Raghavan et al. | 475/5 |
| 2007/0298923 A1* | 12/2007 | Raghavan | 475/5 |
| 2008/0015073 A1* | 1/2008 | Raghavan et al. | 475/5 |
| 2008/0146408 A1* | 6/2008 | Tabata et al. | 477/35 |

FOREIGN PATENT DOCUMENTS

EP      0517675 A1 *  9/1992

* cited by examiner

*Primary Examiner*—Sherry L Estremsky
*Assistant Examiner*—Erin D Bishop
(74) *Attorney, Agent, or Firm*—Carlson, Gaskey & Olds

(57) ABSTRACT

A transmission includes a ring gear driven by a first primary gear train, a carrier driven by a second primary gear train and a sun gear driven by a third primary gear train. Clutches are utilized to lock and unlock the ring gear, carrier and sun gear. When locked each rotate at the same speed and the torques are added together at an output shaft to provide a high torque low speed output from the transmission. As the transmission accelerates the clutches are disengaged allowing the ring gear, carrier and sun gear to rotate separately and achieve higher speeds, providing a continuous output from high torque to high speed operation.

16 Claims, 10 Drawing Sheets

US 7,708,663 B2

CONTINUOUSLY VARIABLE CONSTANT MESH EPICYCLIC TRANSMISSION

BACKGROUND OF THE INVENTION

The invention generally relates to a transmission providing an uninterrupted transition from high torque to high speed operation.

Transmissions commonly operate in both high torque, low speed and low torque, high speed situations. At start up of an associated vehicle the transmission is moving at low speeds with a higher torque output required by the vehicle. As the speed of the vehicle and transmission increases lower torque output from the transmission is required. Typically, when transferring from high torque to high speed operation the transmission requires at least one shift to change the gear ratios. Each time a gear shift occurs the output of power from the transmission is momentarily interrupted.

To reduce the number of such power interruptions, continuously variable transmissions have been utilized. Continuously variable transmissions employ electric motors to provide input to the transmission at low speeds. Use of the electric motor provides a greater range of operating speed for the transmission before a gear shift is required. However, while greater ranges of transmission speeds are available, known designs are limited in the amount of torque available at the output of the transmission. Thus, using continuously variable transmission in applications requiring high torque is not always practical.

An improved arrangement for providing a continuously variable transmission which allows an uninterrupted transition from high torque to high speed is needed.

SUMMARY OF THE INVENTION

An example transmission according to this invention provides high torque output and an uninterrupted transition from high torque to high speed operation.

Power is transmitted to a first primary gear train to drive a ring gear, a second primary gear train to drive a carrier and a third primary gear train to drive a sun gear.

At a high torque low speed situation the ring gear, carrier and sun gear can be locked together using clutches, to all rotate at the same speed. In this condition, the epicyclic gear train is not able to act as a differential. An output shaft, driven by the sun gear, is operating at the same speed. Because the gears are locked together torque from the ring gear, carrier, and sun gear is added together at the output shaft to provide a high torque, low speed output from the transmission.

As the vehicle continues to accelerate, high torque from the transmission is no longer required. One of the clutches may be disengaged, allowing the epicyclic gear train to act as a differential. In this mode, the epicyclic gear train becomes a speed summing device, rather than a torque summing device. With the carrier gear held at a constant speed, the ring gear can be slowed down, further increasing the speed of the sun gear.

As the transmission continues to accelerate, the speed capacity of the third primary gear train is approached and another clutch is disengaged to protect the third primary gear train from an over speed condition. In this mode, locomotion is provided by the first primary gear train and the second primary gear train only. After the ring gear speed is brought to zero, the ring gear can be driven in the opposite direction of the carrier to further increase the rotational speed of the sun gear.

Therefore, the transmission provides a continuous output from high torque to high speed operation.

These and other features of the present invention can be best understood from the following specification and drawings, the following of which is a brief description.

DETAILED DESCRIPTION OF THE PREFERRED EMBODIMENT

Figure 1:
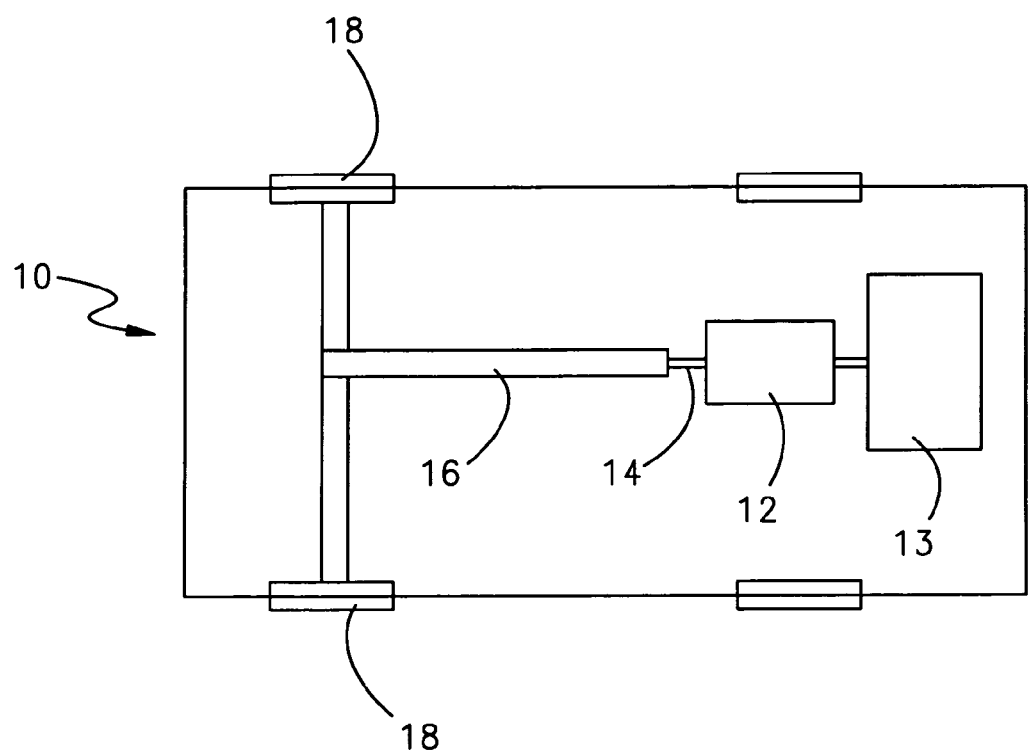
FIG. 1 is a schematic view of a vehicle having an example continuously variable constant mesh epicyclic transmission of the present invention.
Figure 2:
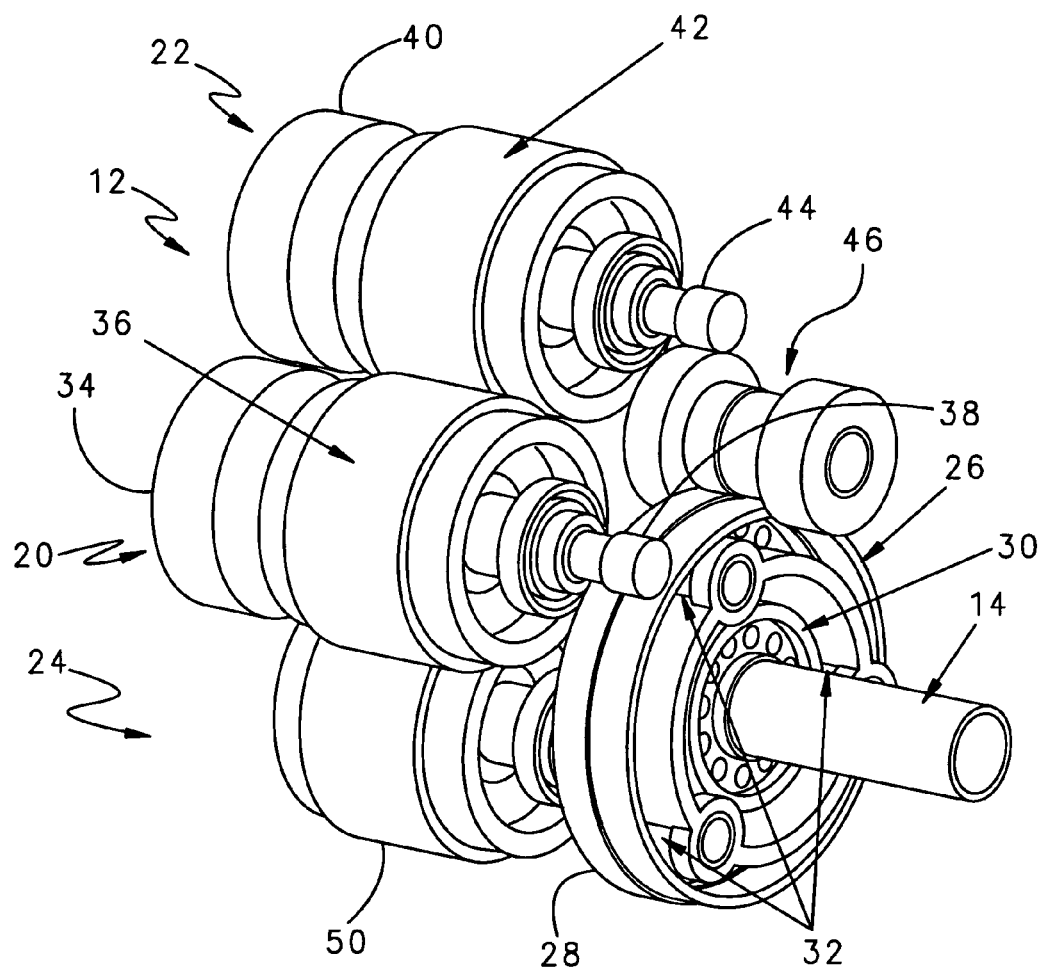
FIG. 2 is a perspective side view of the example transmission.
Figure 3:
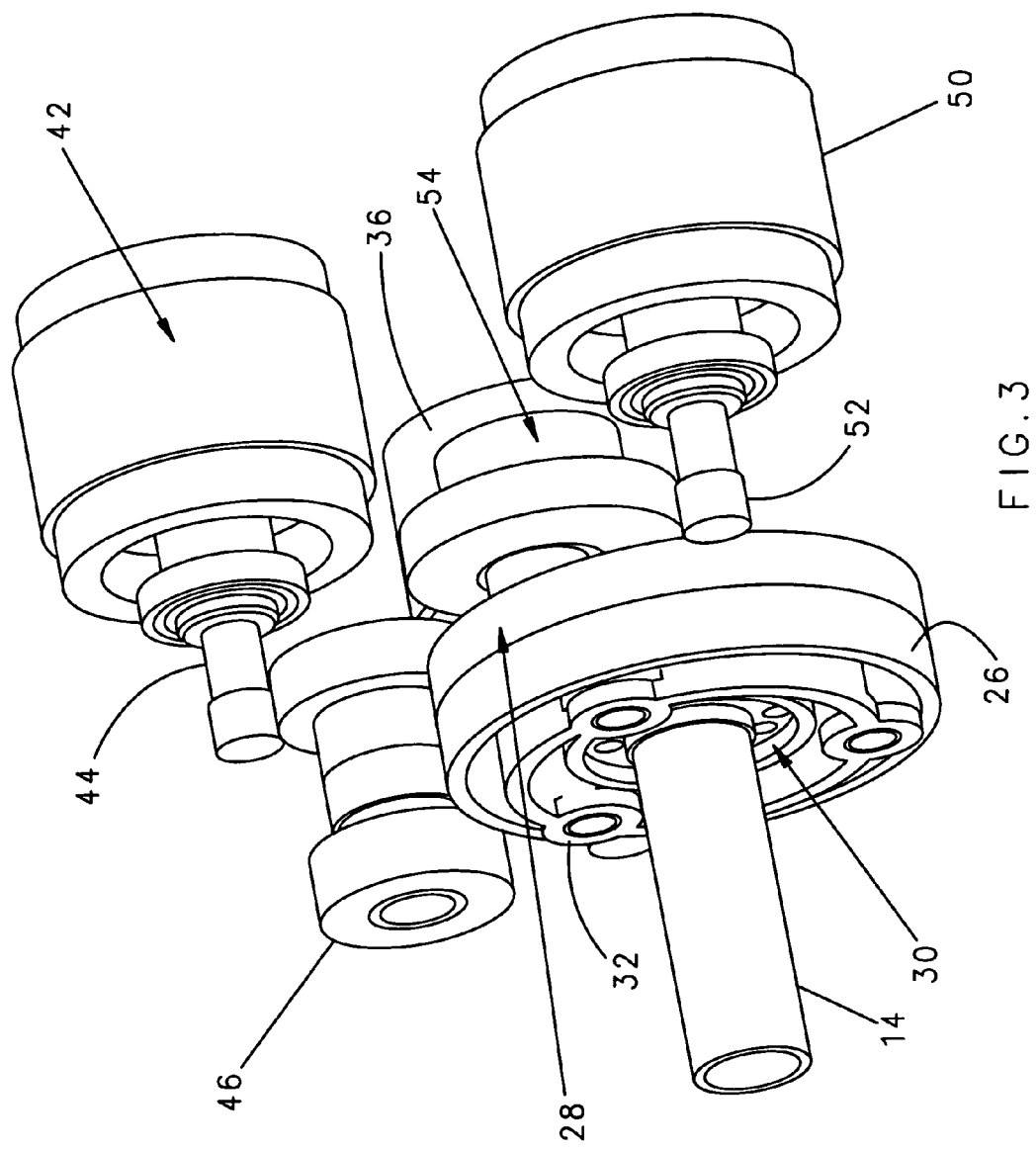
FIG. 3 is a perspective view of the example transmission from the opposing side as FIG. 2.
Figure 4:
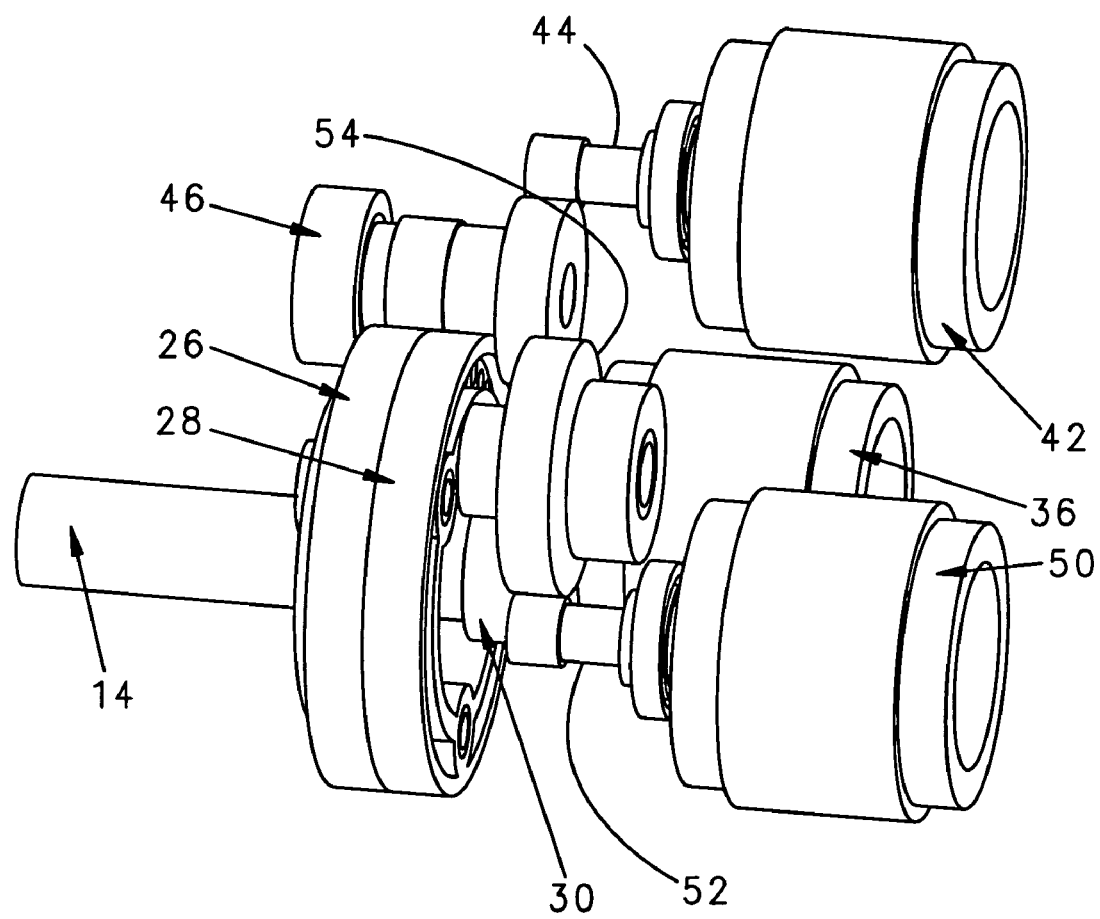
FIG. 4 is a perspective bottom view of the example transmission.

FIG. 1 is a schematic view of a vehicle 10 having an example continuously variable constant mesh epicyclic transmission 12 of the present invention. The vehicle 10 may be any type of driven vehicle requiring a transmission for drive, including automobiles, tracked ground vehicles and farming equipment. A vehicle engine 13 generates power. The power output from the engine 13 may be converted to electric power and transmitted to the transmission 12. The transmission 12 transfers the power into torque to drive the vehicle 10. Torque is transferred from the transmission 12 through an output shaft 14. The output shaft 14 is connected to a driveshaft 16 which carries the torque to wheels 18 of the vehicle 10.

Referring to FIGS. 2 through 5 and 5b, the configuration of the example transmission 12 is explained. The vehicle engine 13 creates power at its output. The power output from the engine 13 is converted to electric power and transmitted to a first primary gear train 20, a second primary gear train 22 and a third primary gear train 24. Alternatively, electric power can be supplied through a battery or generator source.

The first primary gear train 20 is connected to and drives a ring gear 26. The second primary gear train 22 is connected to and drives a carrier 28. The third primary gear train 24 is connected to and drives a sun gear 30. The carrier 28 supports a plurality of planetary gears 32. In the example three planetary gears 32 are utilized. The ring gear 26, carrier 28, planetary gears 32 and sun gear 30 are configured in a typical manner for a planetary gear train. That is, the planetary gears 32 mesh with the ring gear 26 and the sun gear 30. The output shaft 14 is driven by the sun gear 30. Gear teeth on each of the gears are not illustrated for simplicity.

The first primary gear train 20 includes a ring drive brake 34 and a ring drive motor 36. The ring drive motor 36 has a ring drive shaft 38 that meshes with and provides rotational speed and torque to the ring gear 26 from the first primary gear train 20.

The second primary gear train 22 includes a carrier drive brake 40 and a carrier drive motor 42. The carrier drive motor 42 has a carrier drive shaft 44 that meshes with and provides rotational speed and torque to the carrier drive gear 28 from the second primary gear train 22. The lock clutch 46 also engages and disengages the carrier 28 from the ring gear 26. When the lock clutch 46 is engaged the ring gear 26 and the carrier 28 must rotate at the same speed. When the lock clutch 46 is disengaged the ring gear 26 and the carrier 28 may operate at different speeds as in normal planetary gear operation.

Figure 5A:
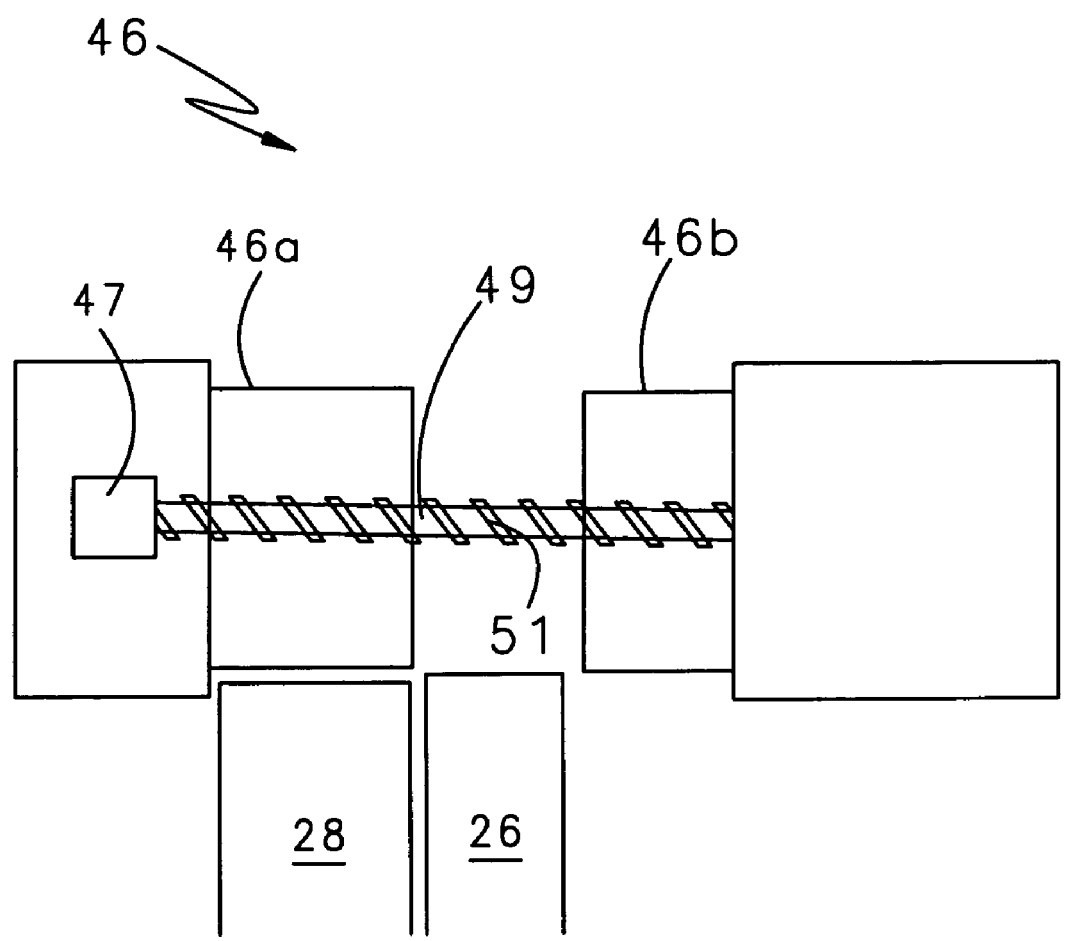
FIG. 5a is a schematic view of an example lock clutch disengaged from a ring gear.
Figure 5B:
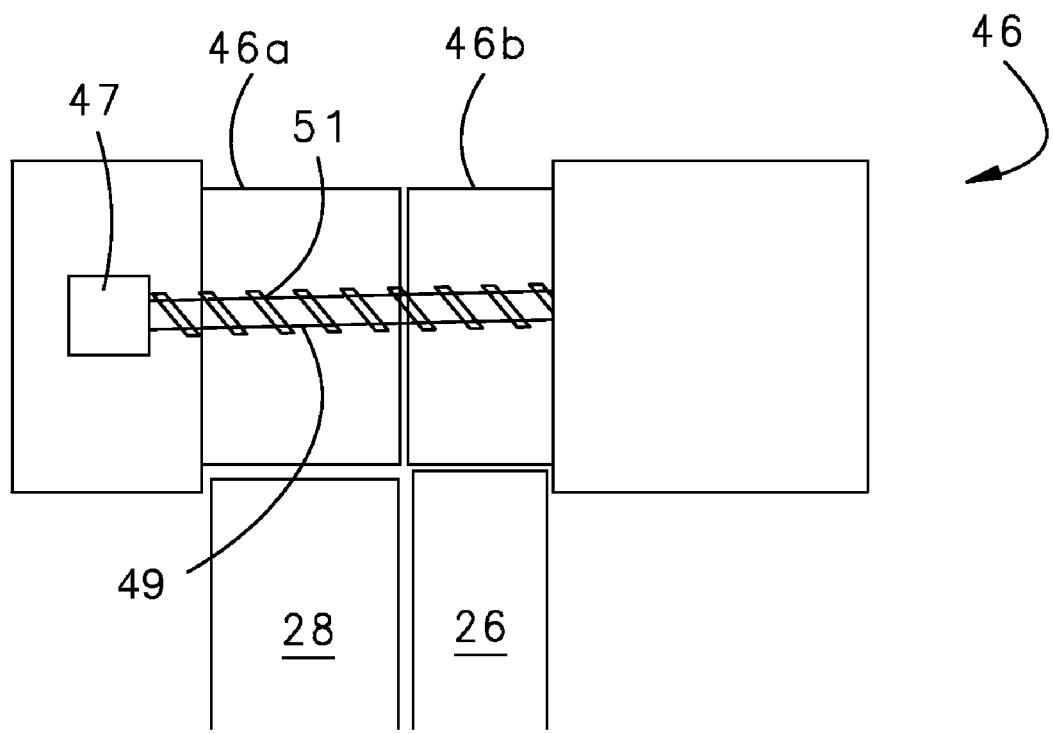
FIG. 5b is a schematic view of an example lock clutch engaged with the ring gear.

An example of lock clutch 46 operation is explained referring to FIGS. 5a and 5b. The lock clutch 46 includes a first engaging portion 46a and a second engaging portion 46b. When the lock clutch 46 is disengaged (FIG. 5a) the first engaging portion 46a meshes with the carrier 28 to provide drive and the second engaging portion 46b is rotating freely while not contacting other components. When a control 47 within the lock clutch 46 commands the lock clutch 46 to engage, an actuator 49 moves the second engaging portion 46b toward the first engaging portion 46a. Movement of the second engaging portion 46b forces the second engaging portion 46b against the ring gear 26 (FIG. 5b). Engagement of the ring gear 26 results in the ring gear 26 rotating at the same speed as the second engaging portion 46b. Thus, the carrier 28 and the ring gear 26 are required to rotate at the same speed as one another. When the actuator 49 is released the second engaging portion 46b spring tension, from a spring 51, moves the second engaging portion 46b away from the ring gear 26. The ring gear 26 can now rotate at a different speed from the carrier 28. The control 47 is connected to sense the speed of the output shaft 14 and commands the actuator 49 to engage or disengage the lock clutch 46 at predetermined speeds. The operation of the actuator may be any suitable drive. A worker in this art could easily design an appropriate device.

The third primary gear train 24 includes a sun drive motor 50. The ring drive motor 36, carrier drive motor 42 and sun drive motor 50 are preferably electric motors. The electric power generated by the engine is sent to drive the motors. The sun drive motor 50 has a sun drive shaft 52 that meshes with and provides rotational speed and torque to a sun drive clutch 54 from the third primary gear train 24. The sun drive clutch 54 transfers the rotational speed and torque from the third primary gear train 24 to the sun gear 30. Rotational speed and torque from the sun gear 30 is then transmitted to the output shaft 14. The sun drive clutch 54 engages and disengages the sun gear 30 from the third primary gear train 24. When the sun drive clutch 54 is engaged the sun gear 30, including the output shaft 14, and the sun drive motor 50 must operate at the same speed. When the sun drive clutch 54 is disengaged the sun gear 30 is not receiving drive from the sun drive motor 50. The sun gear 30 and sun drive motor 50 may now operate at different speeds.

Similar to the lock clutch 46, operation of the sun drive clutch 54 includes a control that senses the speed of the sun drive motor 50 and the output shaft 14. The control moves an actuator to engage or disengage from the sun gear 30. The lock clutch 54 disengages from the sun gear 30 when the sun drive motor 50 reaches a predetermined speed corresponding to the speed capacity of the motor. The lock clutch 54 engages the sun gear 30 at a predetermined speed of the output shaft 14.

If both the lock clutch 46 and the sun drive clutch 54 are engaged the ring gear 26, carrier 28 and sun gear 30 are all operating at the same speed. The ring gear 26, carrier 28, and sun gear 30 operate as a single gear, i.e. the gear ratio through the transmission is 1:1. When the lock clutch 46 and the sun drive clutch 54 are both disengaged the drive for the transmission is provided by the first primary gear train 20 and the second primary gear train 22 only.

Figure 6:
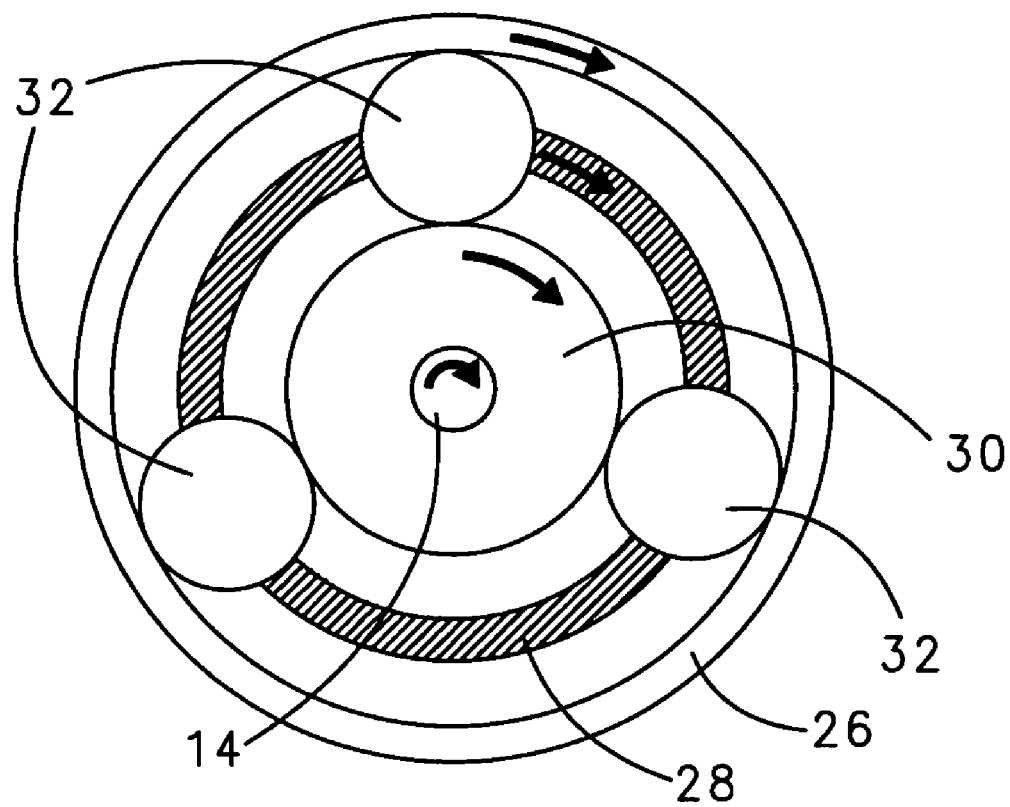
FIG. 6 is a schematic view of the example transmission with the lock clutch and the sun drive clutch engaged.

Referring to FIGS. 6-10 the operation of the transmission 12 is explained. Operation of the motors and clutches is described although configuration of the components is illustrated in FIGS. 2-5. FIG. 6 illustrates a schematic view of the planetary gears at the start of vehicle 10 motion. The lock clutch 46 and the sun drive clutch 54 are both engaged. The ring drive motor 36, carrier drive motor 42 and sun drive motor 50 are all accelerated to rotate the ring gear 26, carrier 28, and sun gear 30 at the same speed. The ring gear 26, carrier 28 and sun gear 30 are rotating relative to the center of rotation, but not rotating relative to one another. Likewise, the planetary gears 32 are rotating about the center of rotation, but are not rotating relative to the carrier 28 or the sun gear 30.

The first primary gear train 20 rotates the ring drive shaft 38. Speed and torque are transmitted from the ring drive shaft 38 to the ring gear 26. The ring gear 26 and the carrier 28 are locked together and must rotate at the same speed. Thus, only the torque from the ring gear 26 is transmitted to the carrier 28. In addition to receiving torque from the ring gear 26, the carrier 28 is also receiving torque from the second primary gear train 22.

The torque from the ring gear 26 and the carrier 28 are both transmitted to the sun gear 30 through the planetary gears 32. The sun gear 30 is rotating at the same speed as the ring gear 26 and the carrier 28. Additionally, the sun gear 30 receives torque from the third primary gear train 24.

The sun gear 30 transmits the torque from the sun drive shaft 52 and both torques from the carrier 28 on to the output shaft 14. The output shaft 14 is operating at the same speed and receiving torque from the ring gear 26, the carrier 28 and the sun gear 30. Thus, when the ring gear 26, carrier 28 and sun gear 30 are locked together, the torque from the first, second and third primary gear trains 20, 22 and 24 is added together at the output shaft 14 of the transmission.

As the vehicle 10 continues to accelerate, high torque from the transmission 12 is no longer required. At a predetermined speed of the output shaft 14 the lock clutch 46 is disengaged. The predetermined speed of the output shaft 14 should correspond to the speed of the vehicle 10 when high torque is no longer required.

Figure 7:
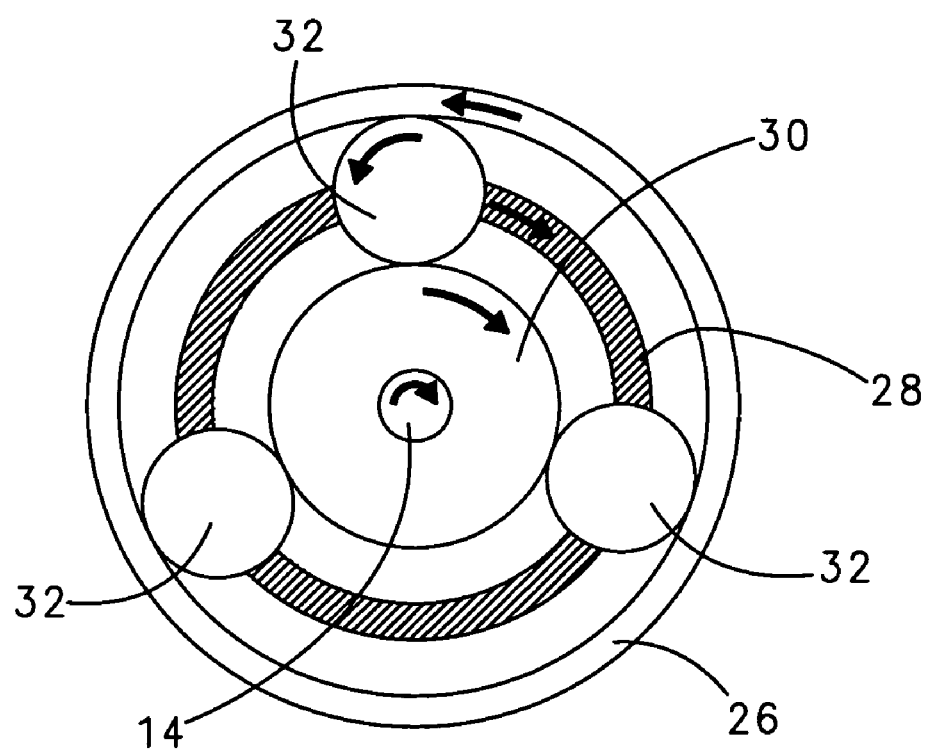
FIG. 7 is a schematic view of the example transmission with the lock clutch disengaged and the sun drive clutch engaged.

FIG. 7 illustrates a schematic view of transmission 12 operation with the lock clutch 46 disengaged and the sun drive clutch 54 engaged. The first primary gear train 20, second primary gear train 22, and third primary gear train 24 are each providing speed and torque. However, the ring gear 26 and the carrier 28 are no longer locked together.

The first primary gear train 20 begins to slow down. When not locked together the ring gear 26 can rotate in the opposite direction with respect to the carrier 28 and the sun gear 30. In this mode, the second primary gear train 22 and the carrier 28 are held at a constant speed while the primary gear train 20 and ring gear 26 are slowed down, causing the third gear train 24 and sun gear 30 to accelerate. The output shaft 14 is operating at a lower torque and higher speed than when both the lock clutch 46 and the sun drive clutch 54 are engaged.

As the transmission 12 continues to accelerate the upper speed limit of the sun drive motor 50 is approached. The sun drive clutch 54 is disengaged at a speed of the output shaft 14 which corresponds to the desired upper speed limit of the sun drive motor 50. The sun drive motor 50 is disengaged to prevent over speed operation.

Figure 8:
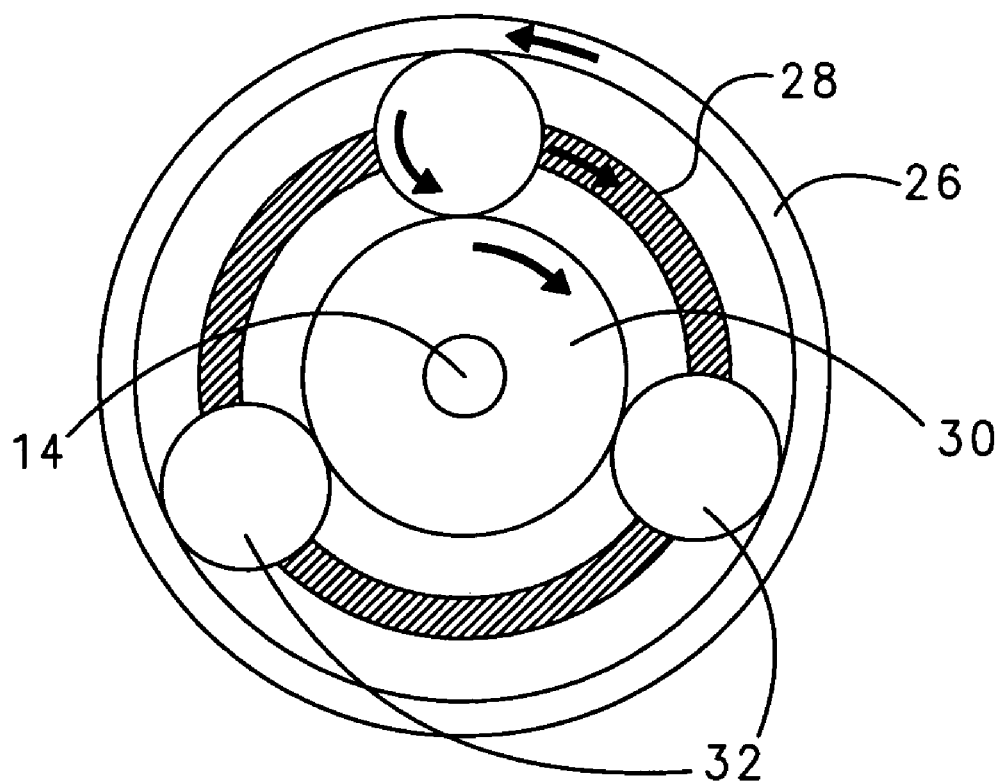
FIG. 8 is a schematic view of the example transmission with the lock clutch and the sun drive clutch disengaged.

FIG. 8 schematically illustrates the operation of the transmission 12 with both the lock clutch 46 and the sun drive clutch 54 disengaged. Locomotion is still provided by both the first and second primary gear trains 20 and 22. The third primary gear train 24 is disengaged.

The ring drive motor 36 and the carrier drive motor 42 continue rotating in opposite directions and the ring drive motor 36 continues accelerating until both are operating at full speed. The ring gear 26 receives speed and torque from the first primary gear train 20. The carrier 28 receives speed and torque from the second primary gear train 22. Since the epicyclic gear train is acting as a differential, the rotational speeds from the ring gear 26 and the carrier 28 are summed together to realize the transmission output speed. In this mode, the torques from the ring gear 26 and the carrier 28 are balanced against one another providing a resultant torque to the transmission output shaft.

With both the lock clutch 46 and the sun drive clutch 54 disengaged the transmission operates at a lower torque and higher speed than when the sun drive clutch 54 is engaged. This arrangement provides the maximum operating speed of the transmission 12.

Figure 9:
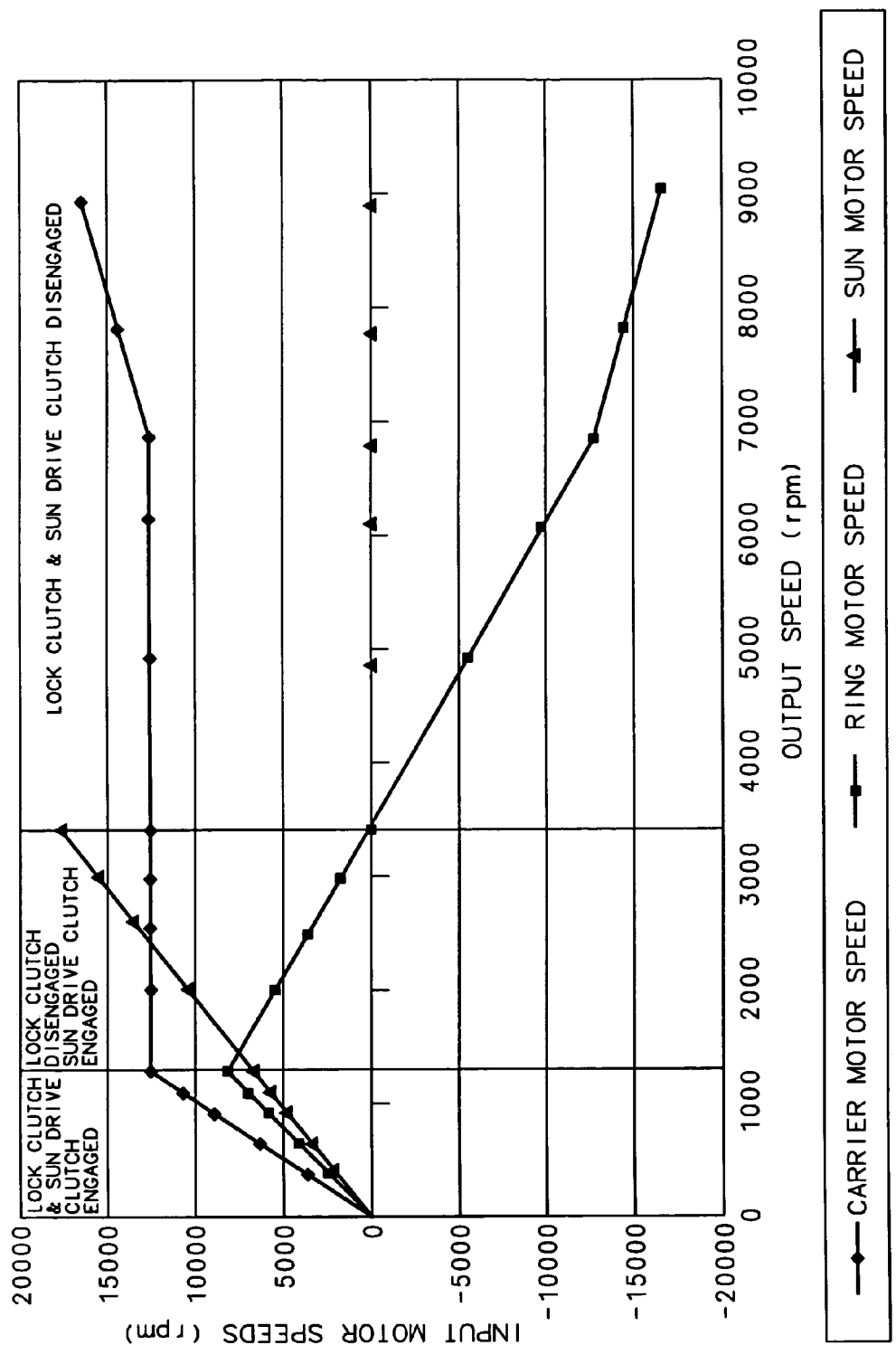
FIG. 9 illustrates the speed of the ring drive motor, carrier drive motor and sun drive motor during operation of the example transmission.

FIG. 9 illustrates the speed of the ring drive motor 36, the carrier drive motor 42 and the sun drive motor 50 during transmission operation. As explained above, at the beginning of transmission 12 operation the ring drive motor 36, the carrier drive motor 42 and the sun drive motor 50 all accelerate to maintain the ring gear 26, carrier 28, and sun gear 30 rotating at the same speed. When the lock clutch 46 is disengaged the ring drive motor 36 is decelerated, decelerating the ring gear 26. The carrier drive motor 42 and the carrier 28 are maintained at a constant speed, while the sun drive motor 50 and the sun gear 30 continue to accelerate. When the sun lock clutch 54 disengages the sun drive motor is no longer driving the sun gear 30 and the speed of the sun drive motor 50 drops to zero revolutions per minute. The carrier drive motor 42 is held at a constant speed, while the ring drive motor 36 continues accelerating in reverse until the ring drive motor 36 reaches its maximum speed. When the transmission 12 is decelerating the ring drive motor 36, carrier drive motor 42 and sun drive motor 50 operate in the opposite manner, i.e. moving from right to left along the plot of FIG. 9.

Although the example embodiment discloses an arrangement for a transmission in a vehicle, the arrangement may be used for any application utilizing a planetary gear set.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A transmission comprising:
    a plurality of primary gear trains connected to a ring gear, a carrier and a sun gear to provide independent drive to each of the ring gear, the carrier and the sun gear;
    a plurality of clutches engaging the carrier, the ring gear and the sun gear to selectively drive the ring gear, the carrier, and the sun gear to rotate at the same speed;
    an output shaft connected to the sun gear to transfer torque from the plurality of primary gear trains to a driveshaft; and
    wherein each of the plurality of primary gear trains comprise an electric motor.

2. The transmission of claim 1, wherein the plurality of primary gear trains comprises a first primary gear train to engage the ring gear, a second primary gear train to engage the carrier and a third primary gear train to engage the sun gear.

3. The transmission of claim 2, wherein the plurality of clutches includes a lock clutch that selectively engages the carrier with the ring gear, and a sun drive clutch that selectively engages the sun gear with the third primary gear train.

4. The transmission of claim 3, wherein the lock clutch disengages the carrier from the ring gear at a predetermined speed of the output shaft.

5. The transmission of claim 3, wherein the sun drive clutch disengages the sun gear from the third primary gear train when the third primary gear train reaches a predetermined maximum speed.

6. The transmission of claim 1, wherein the output shaft transmits a sum of the torques from each of the plurality of primary gear trains when the plurality of clutches are engaged.

7. A continuously variable epicyclic transmission comprising:
    a first primary gear train connected to a ring gear;
    a second primary gear train connected to a carrier;
    a third primary gear train connected to a sun gear, wherein a plurality of planet gears mounted to the carrier engage the ring gear and the sun gear;
    a lock clutch engaging the carrier and the ring gear, and a sun drive clutch engaging the sun gear wherein the lock clutch and the sun drive clutch selectively drive the ring gear, the carrier, and the sun gear to rotate at the same speeds; and
    wherein the lock clutch disengages the ring gear from the carrier gear at a predetermined speed of the sun gear.

8. The transmission of claim 7, wherein the first primary gear train the second primary gear train and the third primary gear train each comprise an electric motor.

9. The transmission of claim 7, wherein an output shaft is driven by the sun gear.

10. The transmission of claim 9, wherein the output shaft transmits a sum of the torques from the first primary gear train, the second primary gear train, and the third primary gear train when the lock clutch and the sun drive clutch are engaged.

11. The transmission of claim 9, wherein the output shaft rotates at maximum speed when the lock clutch and the sun drive clutch are disengaged.

12. A continuously variable epicyclic transmission comprising:
    a first primary gear train connected to a ring gear;
    a second primary gear train connected to a carrier;
    a third primary gear train connected to a sun gear, wherein a plurality of planet gears mounted to the carrier engage the ring gear and the sun gear;
    a lock clutch engaging the carrier and the ring gear, and a sun drive clutch engaging the sun gear wherein the lock clutch and the sun drive clutch selectively drive the ring gear, the carrier, and the sun gear to rotate at the same speed; and
    wherein the third primary gear train is connected to the sun gear through the sun drive clutch.

13. The transmission of claim 12, wherein the sun drive clutch disengages the third primary gear train from the sun drive gear when the third primary gear train reaches a predetermined maximum speed.

14. A method of transferring torque through a transmission comprising:
- a) driving a ring gear, a carrier and a sun gear independently from one another with a plurality of primary gear trains;
- b) selectively engaging the ring gear, the carrier, and the sun gear with a plurality of clutches, the plurality of clutches including a lock clutch and a sun drive clutch, and selectively engaging the ring gear to the carrier with the lock clutch and selectively engaging one of the primary gear trains to the sun gear with the sun drive clutch, and disengaging the lock clutch from the carrier at a predetermined speed of the output shaft; and
- c) transferring torque from the plurality of primary gear trains to a driveshaft through an output shaft driven by the sun gear.

15. The method of claim 14, wherein step c) includes transmitting a sum of the torques from each the plurality of primary gear trains through the output shaft when the plurality of clutches are engaged.

16. A method of transferring torque through a transmission comprising:
- a) driving a ring gear, a carrier and a sun gear independently from one another with a plurality of primary gear trains;
- b) selectively engaging the ring gear, the carrier, and the sun gear with a plurality of clutches, the plurality of clutches including a lock clutch and a sun drive clutch, and selectively engaging the ring gear to the carrier with the lock clutch and selectively engaging one of the primary gear trains to the sun gear with the sun drive clutch, and disengaging the lock clutch from the carrier at a predetermined speed of the output shaft, and disengaging the sun drive clutch from the sun drive gear when the associated primary gear train reaches a predetermined maximum speed; and
- c) transferring torque from the plurality of primary gear trains to a driveshaft through an output shaft driven by the sun gear.

* * * * *

UNITED STATES PATENT AND TRADEMARK OFFICE
CERTIFICATE OF CORRECTION

PATENT NO. : 7,708,663 B2
APPLICATION NO. : 11/527984
DATED : May 4, 2010
INVENTOR(S) : Himmelmann It is certified that error appears in the above-identified patent and that said Letters Patent is hereby corrected as shown below:

Claim 7, Column 6, line 34: "speeds" should read as --speed--

Signed and Sealed this

Third Day of August, 2010

David J. Kappos
*Director of the United States Patent and Trademark Office*